(12) United States Patent
Zhu (10) Patent No.: US 10,681,367 B2
(45) Date of Patent: Jun. 9, 2020

(54) INTRA-PREDICTION VIDEO CODING METHOD AND DEVICE (71) Applicant: BEIJING QIYI CENTURY SCIENCE & TECHNOLOGY CO., LTD., Beijing (CN)

(72) Inventor: Hongbo Zhu, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/313,576

(22) PCT Filed: Aug. 9, 2017

(86) PCT No.: PCT/CN2017/096632
§ 371 (c)(1),
(2) Date: Dec. 27, 2018

(87) PCT Pub. No.: WO2018/040868
PCT Pub. Date: Mar. 8, 2018

(65) Prior Publication Data
US 2019/0327481 A1 Oct. 24, 2019

(30) Foreign Application Priority Data

Aug. 31, 2016 (CN) .......................... 2016 1 0799819

(51) Int. Cl.
*H04N 19/50* (2014.01)
*H04N 19/159* (2014.01)
(Continued)

(52) U.S. Cl.
CPC ........... *H04N 19/50* (2014.11); *H04N 19/159* (2014.11); *H04N 19/176* (2014.11); *H04N 19/189* (2014.11)

(58) Field of Classification Search
CPC .... H04N 19/11; H04N 19/159; H04N 19/174; H04N 19/176; H04N 19/189; H04N 19/436; H04N 19/50; H04N 19/593
See application file for complete search history.

(56) References Cited

U.S. PATENT DOCUMENTS

2009/0310677 A1* 12/2009 Shiodera ................ H04N 19/70
375/240.15
2011/0249735 A1* 10/2011 Zhao .................... H04N 19/105
375/240.12

FOREIGN PATENT DOCUMENTS

CN  106162197 A  11/1916
CN  101600116 A  12/2009
(Continued)

OTHER PUBLICATIONS

Liang et al., "A New Intra-Prediction Method in H.264", *Proceedings of the 14th Academic Conference of China Neural Network* 469-471, 2008.

(Continued)

*Primary Examiner* — Dakshesh D Parikh
*Assistant Examiner* — Tyler B Edwards
(74) *Attorney, Agent, or Firm* — Norton Rose Fulbright US LLP (57) ABSTRACT The present invention provides a video coding intra-frame prediction method and a video coding intra-frame prediction device, wherein, the method comprises performing a bidirectional prediction of an intra-frame left and upper direction prediction and an intra-frame right and lower direction prediction on the current coding block to obtain a prediction result; weighting the prediction result obtained. Since the distance between the current coding block and the reference prediction pixel is closer, thus the prediction correlation is high, thus it could achieve the high accuracy prediction of (Continued)

the intra-frame prediction during the process of video coding and thus could improve the coding efficiency.

10 Claims, 3 Drawing Sheets

(51) Int. Cl.
  *H04N 19/189* (2014.01)
  *H04N 19/176* (2014.01)

(56) References Cited

FOREIGN PATENT DOCUMENTS

| CN | 102685506 A | 9/2012 |
|---|---|---|
| CN | 103929641 | 7/2014 |
| CN | 104104959 A | 10/2014 |

OTHER PUBLICATIONS

International Search Report for PCT/CN2017/096632 dated Nov. 9, 2017.
Extended Search Report issued in Corresponding European Patent Application No. 17845170.4, dated May 3, 2019.
Ai, Mingjing, Yumeng Li, and Qinping Zhao. "A novel intra prediction framework for H. 264/AVC using macroblock-groups with optimized prediction order." MIPPR 2009: Medical Imaging, Parallel Processing of Images, and Optimization Techniques. vol. 7497. International Society for Optics and Photonics, 2009.
Ye, Yan, and Marta Karczewicz. "Improved H. 264 intra coding based on bi-directional intra prediction, directional transform, and adaptive coefficient scanning." 2008 15th IEEE International Conference on Image Processing. IEEE, 2008.
Office Action issued in Corresponding Taiwanese Patent Application No. 106128996, dated Mar. 15, 2019.

* cited by examiner

INTRA-PREDICTION VIDEO CODING METHOD AND DEVICE

CROSS-REFERENCE TO RELATED APPLICATIONS

The present application is a national phase application under 35 U.S.C. § 371 of International Application No. PCT/CN2017/096632 filed Aug. 9, 2017, which claims the priority to a Chinese patent application No. 201610799819.8, on Aug. 31, 2016 and entitled "INTRA-PREDICTION VIDEO CODING METHOD AND DEVICE". The entire contents of each of the above-referenced applications are incorporated into the present application by reference-in their entireties.

TECHNICAL FIELD

The present application relates to the field of video coding, and in particular relates to a video coding intra-frame prediction method and a video coding intra-frame prediction device.

BACKGROUND

Figure 1:
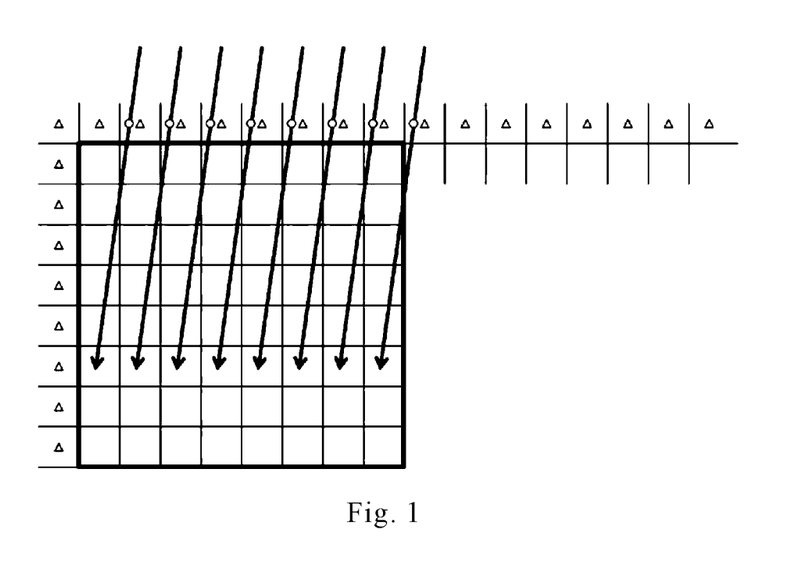
FIG. 1 is a schematic diagram of a video coding intra-frame prediction in the prior art.

Starting from the H.264 highly compressed digital video codec standard, intra-frame direction prediction coding has become the mainstream technology of video intra-frame block coding. In such technique, the prediction of the current coding block is linearly predicted from its left adjacent column and upper adjacent row according to one direction. As shown in FIG. 1, the current coding block is an 8×8 block, and the pixels represented by the triangle are the left and upper adjacent reference pixels of the current block. Intra-frame prediction first specifies a direction, and then each row or column in the current block is obtained from its left adjacent column and upper adjacent row according to this direction, the sixth row as shown in the figure is mapped to the pixel position of the upper adjacent row according to the direction shown in the figure, as shown by the dots in the figure. Because these dots are not the integer pixel, they need to be calculated based on their subpixel coordinates by interpolation algorithm according to the known integer pixel, that is, the triangle pixels shown in the figure.

One problem presents in the existing intra-frame prediction is that, since the reference prediction pixel is located at the left and upper adjacent positions of the block, and the prediction correlation is lower as the distance is farther, so for the right and lower pixel of the current block whose distance is farther, it is clear that the prediction accuracy is not high, thus reducing the coding efficiency.

How to provide a video coding intra-frame prediction method and video coding intra-frame prediction device of high prediction accuracy have become an urgent problem to be solved.

SUMMARY

The embodiments of the present application provides a video coding intra-frame prediction method and a video coding intra-frame prediction device, in order to solve a defect in the prior art that the pixel in current video coding block far away from a reference prediction pixel has a low prediction accuracy, thereby realizing the high prediction accuracy of the current video coding block.

In order to solve the above problems, the present application discloses a video coding intra-frame prediction method, which comprises the steps of:

performing a bidirectional prediction comprising an intra-frame left and upper direction prediction and an intra-frame right and lower direction prediction on a current coding block during video coding.

In the method described in the present invention, the bidirectional prediction further comprises: performing the intra-frame left and upper direction prediction and the intra-frame right and lower direction prediction on the current coding block and performing weighting during video coding.

In the method described in the present invention, the intra-frame left and upper direction prediction on the current coding block is performed based on a rightmost pixel column of a coding block adjacent to the left of the current coding block and a lowermost pixel row of a coding block adjacent to the upper of the current coding block; wherein, when one of the corresponding pixel column or pixel row is not present, the intra-frame left and upper prediction is performed based only on the present pixel row or pixel column;

the intra-frame right and lower direction prediction on the current coding block is performed based on a leftmost pixel column of a coding block adjacent to the right of the current coding block and a uppermost pixel row of a coding block adjacent to the lower of the current coding block; wherein, when one of the corresponding pixel column or pixel row is not present, the intra-frame right and lower prediction is performed based only on the present pixel row or pixel column; and weighting a prediction in which both of the intra-frame left and upper direction prediction and the intra-frame right and lower direction prediction are performed.

In the method described in the present invention, when the video coding is performed on two horizontally adjacent coding blocks simultaneously, wherein the first coding block from left to right in the two coding blocks is a first coding block, and the second coding block from left to right in the two coding blocks is a second coding block, performing the intra-frame left and upper direction prediction on the first coding block based on the lowermost pixel row of a coding block adjacent to the upper of the first coding block and the rightmost pixel column of a coding block adjacent to the left of the first coding block, performing the intra-frame right and lower direction prediction based on the leftmost pixel column of the second coding block, and weighting the intra-frame left and upper direction prediction and the right and lower direction prediction; and performing the intra-frame left and upper direction prediction on the second coding block based on the lowermost pixel row of a coding block adjacent to the upper of the second coding block and the rightmost pixel column of the first coding block, and not performing the intra-frame right and lower prediction.

In the method described in the present invention, when simultaneously performing the video coding on four coding blocks that are adjacent vertically and horizontally, wherein the upper left coding block is an A coding block, the upper right coding block is a B coding block, the lower left coding block is a C coding block, and the lower right coding block is a D coding block, performing the intra-frame left and upper direction prediction on the A coding block based on the lowermost pixel row of a coding block adjacent to the upper of the A coding block and the rightmost pixel column of a coding block adjacent to the left of the A coding block, performing the intra-frame right and lower direction prediction on the A coding block based on the leftmost pixel column of the B coding block and the uppermost pixel row of the C coding block, and weighting the intra-frame left and upper direction prediction and the right and lower direction prediction;

performing the intra-frame left and upper direction prediction on the B coding block based on the lowermost pixel row of a coding block adjacent to the upper of the B coding block and the rightmost pixel column of the A coding block, performing the intra-frame right and lower direction prediction on the B coding block based on the uppermost pixel row of the D coding block, and weighting the intra-frame left and upper direction prediction and the right and lower direction prediction;

performing the intra-frame left and upper direction prediction on the C coding block based on the lowermost pixel row of the A coding block and the rightmost pixel column of a coding block adjacent to the left of the C coding block, and performing the intra-frame right and lower direction prediction on the C coding block based on the leftmost pixel column of the D coding block, and weighting the intra-frame left and upper direction prediction and the right and lower direction prediction; and performing the intra-frame left and upper direction prediction on the D coding block based on the lowermost pixel row of the B coding block and the rightmost pixel column of the C coding block, and not performing the intra-frame right and lower prediction.

In order to solve the above problems, the present invention discloses a video coding intra-frame prediction device, wherein, the device comprises:

an intra-frame left and upper prediction unit used for performing an intra-frame left and upper direction prediction on a current coding block; and an intra-frame right and lower prediction unit used for performing an intra-frame right and lower direction prediction on the current coding block.

The device further comprises:

a weighting unit used for weighting the intra-frame left and upper direction prediction and the intra-frame right and lower direction prediction on the current coding block.

In the device described in the present invention, the intra-frame left and upper prediction unit is further used for performing the intra-frame left and upper direction prediction based on a rightmost pixel column of a coding block adjacent to the left of the current coding block and a lowermost pixel row of a coding block adjacent to the upper of the current coding block; wherein, when one of the corresponding pixel column or pixel row is not present, the intra-frame left and upper prediction is performed based only on the present pixel row or pixel column; and the intra-frame right and lower prediction unit is further used for performing the intra-frame right and lower direction prediction based on a leftmost pixel column of a coding block adjacent to the right of the current coding block and a uppermost pixel row of a coding block adjacent to the lower of the current coding block; wherein, when one of the corresponding pixel column or pixel row is not present, the intra-frame right and lower prediction is performed based only on the present pixel row or pixel column.

The present application also discloses an electronic device, comprising a processor, a communication interface, a memory, and a communication bus; wherein the processor, the communication interface, and the memory are communicated with each other via the communication bus;

the memory is used for storing computer programs; and the processor is used for implementing the video coding intra-frame prediction method described above by executing the program stored on the memory.

The present application also discloses a non-transitory computer readable storage medium, wherein, the non-transitory computer readable storage medium stores instructions thereon, and when being executed on a computer, the instructions enable the computer to implement the video coding intra-frame prediction method described above.

The present application also discloses a computer program product comprising instructions, wherein, when being executed on a computer, the instructions enable the computer to implement the video coding intra-frame prediction method described above.

The video coding intra-frame prediction method and the video coding intra-frame prediction device provided in the embodiment of the present application may perform a bidirectional prediction comprising an intra-frame left and upper direction prediction and an intra-frame right and lower direction prediction on a current coding block and perform weightings during video coding. Since the distance between the current coding block and the reference prediction pixel is closer, thus the prediction correlation is high, therefore the high prediction accuracy of the current video coding block is achieved and the coding efficiency is improved.

BRIEF DESCRIPTION OF THE DRAWINGS

In order to illustrate the technical solution in the embodiments of the present application or the prior art more clearly, the following drawings, which are to be used in the description of the embodiments or the prior art, are briefly described below.

DETAILED DESCRIPTION

The technical solution in the embodiments of the present application will be described below with reference to the accompanying drawings in embodiments of the present application.

In order to achieve a high accuracy prediction on a current video coding block and improve the coding efficiency, an embodiment of the present application provides a video coding intra-frame prediction method.

The video coding intra-frame prediction method provided in the embodiment of the present application is described below.

Figure 2:
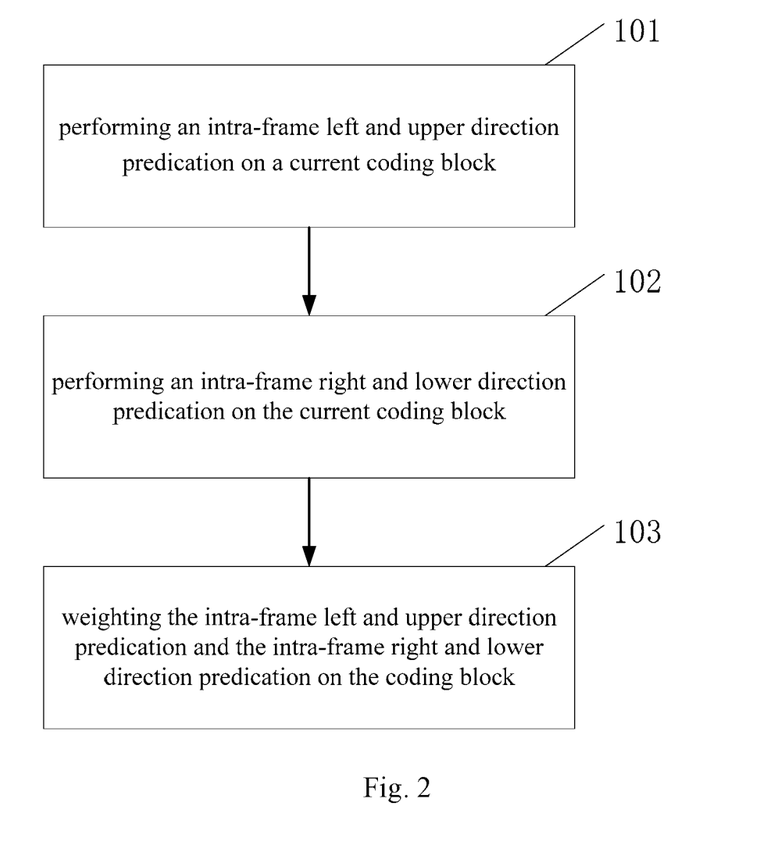
FIG. 2 is a flow chart of steps of an embodiment of a video coding intra-frame prediction method in the present application.

Referring to FIG. 2, a flow chart of steps of a video coding intra-frame prediction method of an embodiment of the present application is shown.

The method of the present embodiment comprises the following steps:

Step 101: performing an intra-frame left and upper direction prediction on a current coding block during video coding;

Step 102: performing a bidirectional prediction including an intra-frame right and lower direction prediction on the current coding block;

Step 103: weighting the intra-frame left and upper direction prediction and the intra-frame right and lower direction prediction on the coding block.

In the present embodiment, the above step of performing a bidirectional prediction including an intra-frame left and upper direction prediction and an intra-frame right and lower direction prediction on a current coding block may include:

when the rightmost pixel column of a coding block adjacent to the left of the current coding block and the lowermost pixel row of a coding block adjacent to the upper of the current coding block are both present, performing the intra-frame left and upper direction prediction based on the rightmost pixel column of a coding block adjacent to the left of the current coding block and the lowermost pixel row of a coding block adjacent to the upper of the current coding block;

when one of the rightmost pixel column of a coding block adjacent to the left of the current coding block and the lowermost pixel row of a coding block adjacent to the upper of the current coding block is not present, performing the intra-frame left and upper prediction based on the present pixel row or pixel column;

when the leftmost pixel column of a coding block adjacent to the right of the current coding block and the uppermost pixel row of a coding block adjacent to the lower of the current coding block are both present, performing intra-frame right and lower direction prediction based on the leftmost pixel column of a coding block adjacent to the right of the current coding block and the uppermost pixel row of a coding block adjacent to the lower of the current coding block;

when one of the leftmost pixel column of a coding block adjacent to the right of the current coding block and the uppermost pixel row of a coding block adjacent to the lower of the current coding block is not present, performing the intra-frame right and lower prediction based only on the present pixel row or pixel column.

Specifically, performing the intra-frame left and upper direction prediction on the current coding block may include performing the intra-frame left and upper direction prediction based on the rightmost pixel column of a coding block adjacent to the left of the current coding block and the lowermost pixel row of a coding block adjacent to the upper of the current coding block; wherein, when one of the corresponding pixel column or pixel row is not present, the intra-frame left and upper prediction is performed based only on the present pixel row or pixel column; when the corresponding pixel column or pixel row is both not present, the intra-frame left and upper prediction is not performed.

That is, when the rightmost pixel column of a coding block adjacent to the left of the current coding block and the lowermost pixel row of a coding block adjacent to the upper of the current coding block are both present, it indicates that the left adjacent coding block and the upper adjacent coding block of the current coding block are both present, then the intra-frame left and upper direction prediction can be performed based on the rightmost pixel column of the left adjacent coding block and the lowermost pixel row of the upper adjacent coding block of the current coding block. When the rightmost pixel column of the left adjacent coding block of the current coding block is not present, it indicates that the left adjacent coding block of the current coding block is not present, and that the current coding block is likely to be the leftmost coding block of image frame, then the intra-frame left and upper direction prediction can be performed based only on the lowermost pixel row of the upper adjacent coding block of the current coding block. When the lowermost pixel row of the upper adjacent coding block of the current coding block is not present, it indicates that the upper adjacent coding block of the current coding block is not present, and that the current coding block is likely to be the uppermost coding block of the image frame, then the intra-frame left and upper direction prediction is performed based only on the rightmost pixel column of the left adjacent coding block of the current coding block. When neither the rightmost pixel column of the left adjacent coding block of the current coding block nor the lowermost pixel row of the upper adjacent coding block of the current coding block is present, it indicates that neither the left adjacent coding block nor the upper adjacent coding block of the current coding block is present, the current coding block is likely to be the uppermost left coding block of the image frame, then it may not perform the intra-frame left and upper prediction.

Performing the intra-frame right and lower direction prediction on the current coding block may comprise: performing the intra-frame right and lower direction prediction based on the leftmost pixel column of right adjacent coding block of the current coding block and the uppermost pixel row of lower adjacent coding block of the current coding block; wherein, when one of the corresponding pixel column or pixel row is not present, the intra-frame right and lower prediction is performed based only on the present pixel row or pixel column; when neither the corresponding pixel column nor corresponding pixel row is present, then the intra-frame right and lower prediction is not performed.

That is, when the leftmost pixel column of the right adjacent coding block of the current coding block and the uppermost pixel row of the lower adjacent coding block of the current coding block are both present, it indicates that the right adjacent coding block and the lower adjacent coding block of the current coding block are both present, then the intra-frame right and lower direction prediction can be performed based on the leftmost pixel column of the right adjacent coding block and the uppermost pixel row of the lower adjacent coding block of the current coding block. When the leftmost pixel column of the right adjacent coding block of the current coding block is not present, it indicates that the right adjacent coding block of the current coding block is not present, and that the current coding block is likely to be the rightmost coding block of the image frame, then the intro-frame right and lower direction prediction is performed based only on the uppermost pixel row of the lower adjacent coding block of the current coding block. When the uppermost pixel row of the lower adjacent coding block of the current coding block is not present, it indicates that the lower adjacent coding block of the current coding block is not present, and that the current coding block is likely to be the lowermost coding block of the image frame, then the intra-frame right and lower direction prediction is performed based only on the leftmost pixel column of the right adjacent coding block of the current coding block. When neither the leftmost pixel column of the right adjacent coding block of the current coding block nor the uppermost pixel row of the lower adjacent coding block of the current coding block is present, it indicates that neither the right adjacent coding block nor the lower adjacent coding block of the current coding block is present, the current coding block is likely to be the lowermost right coding block of the image frame, then it may not perform the intra-frame right and lower prediction.

In the present embodiment of the method, the bidirectional prediction including the intra-frame left and upper direction prediction and the intra-frame right and lower direction prediction is performed and weighted for the current coding block during the video coding. Since the distance between the current coding block and the reference prediction pixel is closer, thus the prediction correlation is high, therefore the high prediction accuracy of the current video coding block is achieved and the coding efficiency is improved.

As an implementation manner of the embodiment of the present invention, the above current coding blocks are two horizontally adjacent coding blocks, wherein the first coding block from left to right is a first coding block, the second coding block from left to right is a second coding block;

the above step of performing a bidirectional prediction including an intra-frame left and upper direction prediction and an intra-frame right and lower direction prediction on the current coding block may include:

for the first coding block, the intra-frame left and upper direction prediction is performed based on the lowermost pixel row of a coding block adjacent to the upper of the first coding block and the rightmost pixel column of a coding block adjacent to the left of the first coding block; and the intra-frame right and lower direction prediction is performed based on the leftmost pixel column of the second coding block;

for the second coding block, the intra-frame left and upper direction prediction is performed based on the lowermost pixel row of a coding block adjacent to the upper of the second coding block and the rightmost pixel column of the first coding block.

Figure 3:
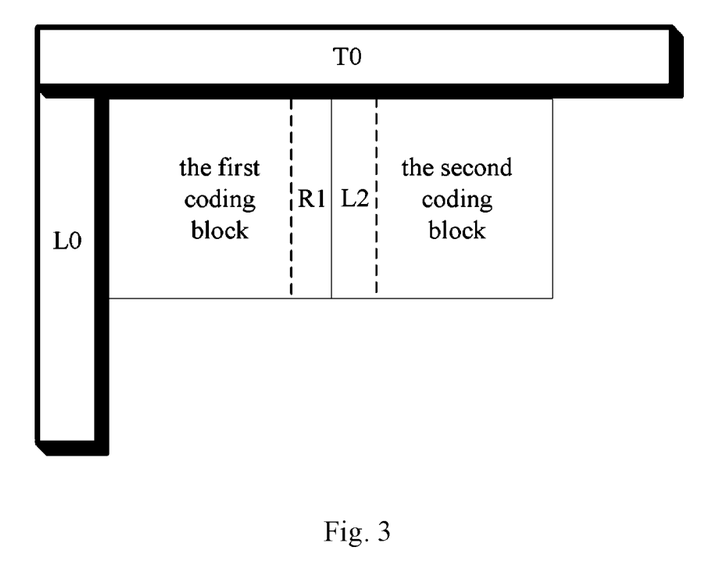
FIG. 3 is a schematic diagram of an intra-frame prediction in a video coding of the present application when two horizontally adjacent coding blocks are encoded simultaneously.

Referring to FIG. 3, a schematic diagram of intra-frame prediction in the video coding of the present application when two horizontally adjacent coding blocks are encoded simultaneously is shown. That is, the current coding blocks include two horizontally adjacent coding blocks.

When performing video coding simultaneously for these two horizontally adjacent coding blocks, as shown in FIG. 3, the first coding block from the left to the right is a first coding block; the second coding block from the left to the right is a the second coding block; T0 is the lowermost pixel row of the upper adjacent coding block of the first coding block and the second coding block, in which T0 is a known reference pixel row in the present embodiment; L0 is the rightmost pixel column of the left adjacent coding block of the first coding block, in which L0 is a known reference pixel column in the present embodiment; R1 is the rightmost pixel column of the first coding block; L2 is the leftmost pixel column of the second coding block.

Wherein, when encoding the first coding block, the intra-frame left and upper direction prediction is performed based on the lowermost pixel row T0 of the upper adjacent coding block and the rightmost pixel column L0 of a coding block adjacent to the left of the first coding block; and the intra-frame right and lower direction prediction is performed based on the leftmost pixel column L2 of the second coding block, and the intra-frame left and upper direction prediction and the intra-frame right and lower direction prediction are weighted.

When encoding the second coding block, the intra-frame left and upper direction prediction is performed based on the lowermost pixel row T0 of a coding block adjacent to the upper of the second coding block and the rightmost pixel column R1 of the first coding block; an intra-frame right and lower prediction is not performed.

The specific formulas are as follows:

$$R1 = P(L0, T0, dir0) \cdot q + (1-q) \cdot P(L2, dir0) + rsdl0 \quad \text{Formula 1:}$$

$$L2 = P(R1, T0, dir1) + rsdl1 \quad \text{Formula 2:}$$

Wherein, P represents the intra-frame prediction operation, dir0 is the current prediction direction, P (L0, T0, dir0) means to generate an intra-frame prediction vector of R1 in the direction of dir0 and referred to L0 and T0.

P (L2, dir0) means to generate a prediction of R1 in the direction of dir0 and referred to L2. The q is a constant, which is greater than 0 and less than 1, indicating a weighting prediction, that is, the prediction of R1 is obtained from the weighting prediction of the known L0 and T0 and the right L2. The rsdl0 and rsdl1 are residual vectors, which are obtained by performing DCT transform, quantization, inverse quantization and inverse DCT transform on residual resulting from subtracting the first coding block from predicted first coding block, while the prediction of L2 is generated according to R1 and T0. There are only two unknown vectors in the above two formulas, namely, R1 and L2, replacing L2 in formula 1 with formula 2, R1 could be solved by solving the formula, and then the second coding block could be obtained according to R1 and T0, meanwhile also L2 is obtained, then the first coding block is solved.

In addition, in the present embodiment, rsdl0 is obtained by: performing transform-quantization-inverse quantization-inverse transform on the difference resulting from the source pixel block of the first coding block subtracting its intra-frame prediction block to obtain reconstructing residual block, and then taking the rightmost column of the reconstructing residual block, that is, rsdl0.

The rsdl1 is obtained by: performing transform-quantization-inverse quantization-inverse transform on the difference resulting from the source pixel block of the second coding block subtracting its intra-frame prediction block to obtain reconstructing residual block, and then taking the leftmost column of the reconstructing residual block, that is, rsdl1.

P (L0, T0, dir0) in the first formula represents the rightmost column of the prediction of the first coding block generated by L0 and T0 according to the direction dir0, and P (L2, dir0) represents the rightmost column of the prediction generated by L2 and the direction dir0. P (R1, T0, dir1) represents the leftmost column of the prediction of the second coding block generated by R1 and T0 according to the direction dir1.

The above is the intra-frame prediction performed under the condition that the residual vectors and the left and upper pixel sources are already available.

In initial coding, there are only left and upper adjacent row and column, as well as the original two current pixel blocks, that is, the first coding block and the second coding block. At this time, predictions of the first coding block and the second coding block are generated directly, as for the non-last blocks, in fact, performing bidirectional predictions are needed, here, when generate the prediction in first time, in addition to the most left and upper rows and columns, the rest of all use the original pixels to generate the prediction, and then weight, and perform transform-quantization-inverse quantization-inverse transform on the difference resulting from subtracting the source pixel from its prediction to obtain a reconstructed residual, that is the rsdl.

In the present embodiment, the bidirectional prediction of the intra-frame left and upper direction prediction and intra-frame right and lower direction prediction on the current coding block is performed and weighted. Since the distance between the current coding block and the reference prediction pixel is closer, thus the prediction correlation is high, therefore the high prediction accuracy of the current video coding block is achieved, and two horizontally adjacent coding blocks could be simultaneously encoded, and the coding efficiency is further improved.

As an implementation manner of the embodiment of the present invention, the above current coding blocks are four coding blocks that are adjacent vertically and horizontally, wherein the upper left coding block is an A coding block, the upper right coding block is a B coding block, the lower left coding block is a C coding block, and the lower right coding block is a D coding block;

the above step of performing a bidirectional prediction including an intra-frame left and upper direction prediction and an intra-frame right and lower direction prediction on a current coding block may include:

for the A coding block, the intra-frame left and upper direction prediction is performed based on the lowermost pixel row of a coding block adjacent to the upper of the A coding block and the rightmost pixel column of a coding block adjacent to the left of the A coding block; and the intra-frame right and lower direction prediction is performed based on the leftmost pixel column of the B coding block and the uppermost pixel row of the C coding block;

for the B coding block, the intra-frame left and upper direction prediction is performed based on the lowermost pixel row of a coding block adjacent to the upper of the B coding block and the rightmost pixel column of the A coding block; and the intra-frame right and lower direction prediction is performed based on the uppermost pixel row of the D coding block;

for the C coding block, the intra-frame left and upper direction prediction is performed based on the lowermost pixel row of the A coding block and the rightmost pixel column of a coding block adjacent to the left of the C coding block; and the intra-frame right and lower direction prediction is performed based on the leftmost pixel column of the D coding block;

for the D coding block, the intra-frame left and upper direction prediction is performed based on the lowermost pixel row of the B coding block and the rightmost pixel column of the C coding block.

Figure 4:
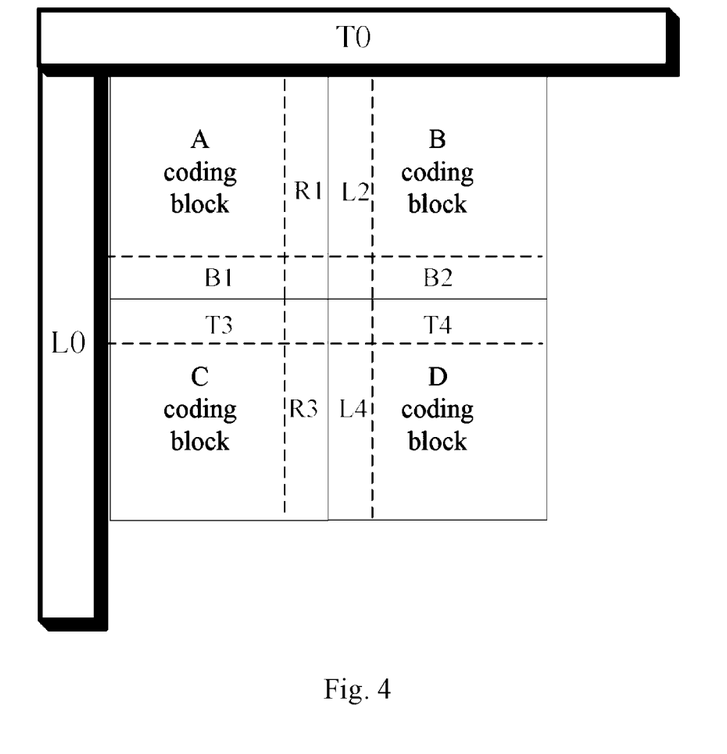
FIG. 4 is a schematic diagram of an intra-frame prediction in a video coding of the present application when four vertically and horizontally adjacent coding blocks are encoded simultaneously.

Referring to FIG. 4, a schematic diagram of intra-frame prediction in the video coding of the present application when four coding blocks which are vertically and horizontally adjacent code simultaneously is shown. That is, the current coding blocks include four vertically and horizontally adjacent coding blocks.

When performing video coding for these four vertically and horizontally adjacent coding blocks simultaneously, referring to FIG. 4, wherein the upper left coding block is an A coding block, the upper right coding block is a B coding block, the lower left coding block is a C coding block, and the lower right coding block is a D coding block.

T0 is the lowermost pixel row of the upper adjacent coding block of the A coding block and the B coding block, and T0 is a known reference pixel row in the present embodiment; L0 is the rightmost pixel column of the left adjacent coding block of the A coding block and the C coding block, L0 is a known reference pixel column in the present embodiment; R1 is the rightmost pixel column of the A coding block; B1 is the lowermost pixel row of the A coding block; L2 is the leftmost pixel column of the B coding block; B2 is the lowermost pixel row of the B coding block; T3 is the uppermost pixel row of the C coding block; R3 is the rightmost pixel column of the C coding block; L4 is the leftmost pixel column of the D coding block; T4 is the uppermost pixel row of the D coding block.

When encoding the A coding block, the intra-frame left and upper direction prediction is performed based on the lowermost pixel row T0 of its upper adjacent coding block and the rightmost pixel column L0 of its left adjacent coding block; and the intra-frame right and lower direction prediction is performed based on the leftmost pixel column L2 of the B coding block and the uppermost pixel row T3 of the C coding block, and weighting the intra-frame left and upper direction prediction and intra-frame right and lower direction prediction.

When encoding the B coding block, the intra-frame left and upper direction prediction is performed based on the lowermost pixel row T0 of its upper adjacent coding block and the rightmost pixel column R1 of the A coding block; and the intra-frame right and lower direction prediction is performed based on the uppermost pixel row T4 of the D coding block, and weighting the intra-frame left and upper direction prediction and intra-frame right and lower direction prediction.

When coding the C coding block, the intra-frame left and upper direction prediction is performed based on the lowermost pixel row B1 of the A coding block and the rightmost pixel column L0 of its left adjacent coding block; and the intra-frame right and lower direction prediction is performed based on the leftmost pixel column L4 of the D coding block, and weighting the intra-frame left and upper direction prediction and intra-frame right and lower direction prediction.

When coding the D coding block, the intra-frame left and upper direction prediction is performed based on the lowermost pixel row B2 of the B coding block and the rightmost pixel column R3 of the C coding block; the intra-frame right and lower prediction is not performed.

The specific formulas are as follows for the A coding block:

$$B1=P(L0,T0,dir2)*q2+(1-q2)P(T3,L2,dir2)+rsdl2 \quad \text{Formula 1:}$$

$$R1=P(L0,T0,dir2)*p2+(1-p2)P(T3,L2,dir2)+rsdl3 \quad \text{Formula 2:}$$

Here, rsdl2 and rsdl3 are residual vectors. For the A coding block, a bidirectional prediction of its one certain dir2 is obtained by: performing DCT-quantization-inverse quantization-IDCT operation on a residual block resulting from subtracting the source block from its prediction block to obtain a reconstructed residual block, and then taking the bottommost row of the reconstructed residual block, that is, rsdl2, taking the rightmost column of the reconstructed residual block, that is, rsdl3. P (L0, T0, dir2) itself represents the prediction of the A coding block generated by L0 and T0 according to the direction dir2, but in the formula 1 of the present embodiment, it actually represents lowermost row taken from the prediction of the A coding block generated by L0 and T0 according to the direction dir2, while P (L0, T0, dir2) in the formula 2 represents the rightmost column taken from the prediction of the A coding block generated by L0 and T0 according to the direction dir2.

In the same way, the formula of the B coding block, the C coding block, and the D coding block could be listed. For the B coding block, its prediction is obtained from weighting the left and upper prediction based on R1, T0 and the right and lower prediction based on T4, the formulas are as follows:

$$L2=P(R1,T0,\text{dir}3)*q3+(1-q3)*P(T4,\text{dir}3)+rsdl4 \quad \text{Formula 3:}$$

$$B2=P(R1,T0,\text{dir}3)*p3+(1-p3)*P(T4,\text{dir}3)+rsdl5 \quad \text{Formula 4:}$$

For the C coding block, it uses a bidirectional prediction, that is, obtained from weighting the left and upper prediction based on L0, B1 and from the right and lower prediction based on L4, the formulas are as follows:

$$T3=P(L0,B1,\text{dir}4)*q4+(1-q4)*P(L4,\text{dir}4)+rsdl6 \quad \text{Formula 5:}$$

$$R3=P(L0,B1,\text{dir}4)*p4+(1-p4)*P(L4,\text{dir}4)+rsdl7 \quad \text{Formula 6:}$$

For the D coding block, it uses a unidirectional prediction, that is, the left and upper prediction based on B2 and R3, the formulas are as follows:

$$T4=P(B2,R3,\text{dir}5)+rsdl8 \quad \text{Formula 7:}$$

$$L4=P(B2,R3,\text{dir}5)+rsdl9 \quad \text{Formula 8:}$$

There are eight vector equations in the present embodiment, and there are eight unknown vectors, so the equations are solvable.

The above is the intra-frame prediction under the condition of the residual vectors and the left and upper pixel sources are already available.

In the initial coding, there are only left and upper adjacent row and column, as well as the original four current pixel blocks, that is, the A coding block, the B coding block, the C coding block, and the D coding block. At this time, predictions of the A coding block, the B coding block, the C coding block, and the D coding block are generated directly, as for the non-last blocks, in fact, performing bidirectional predictions are needed, here, when generate the prediction in first time, in addition to the most left and upper rows and columns, the rest of all use the original pixels to generate the prediction, and then weight, and perform transform-quantization-inverse quantization-inverse transform on the difference resulting from subtracting the source pixel from its prediction to obtain a reconstructed residual, that is the rsdl.

In the present embodiment, the bidirectional prediction of the intra-frame left and upper direction prediction and intra-frame right and lower direction prediction on the current coding block is performed and weighted. Since the distance between the current coding block and the reference prediction pixel is closer, thus the prediction correlation is high, therefore the high prediction accuracy of the current video coding block is achieved, and two horizontally adjacent coding blocks could be simultaneously encoded, and the coding efficiency is further improved.

Corresponding to embodiments of the method described above, the embodiment of the present invention also provides a video coding intra-frame prediction device. The video coding intra-frame prediction device provided in the embodiment of the present invention is described below.

Figure 5:
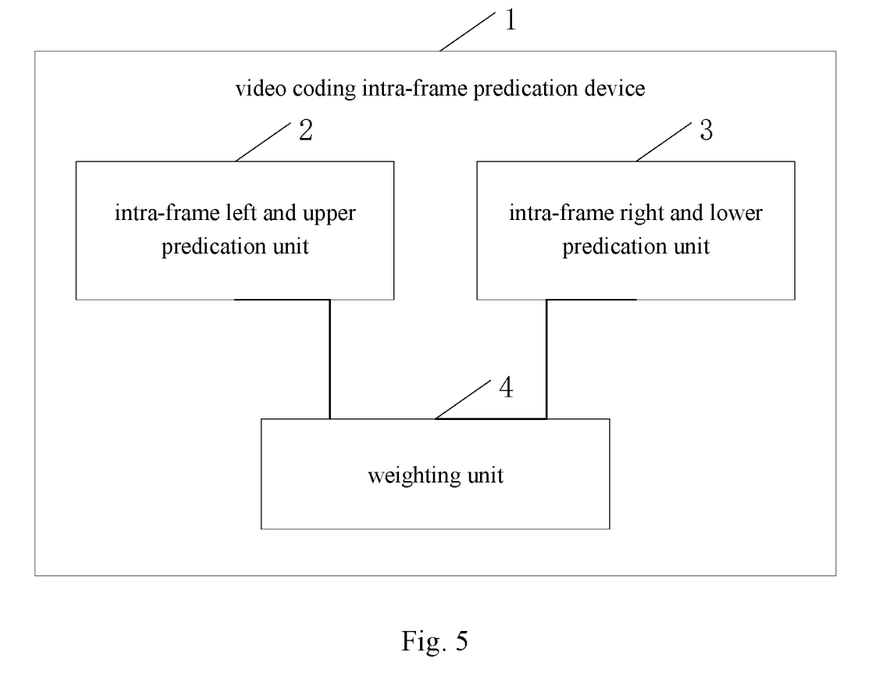
FIG. 5 is a structure block diagram of an embodiment of a video coding intra-frame prediction device in the present invention.

Referring to FIG. 5, a structure block diagram of a video coding intra-frame prediction device of the present application is shown.

The video coding intra-frame prediction device 1 of the present embodiment includes: an intra-frame left and upper prediction unit 2, an intra-frame right and lower prediction unit 3, and a weighting unit 4, wherein:

The intra-frame left and upper prediction unit 2 is used for performing an intra-frame left and upper direction prediction on a current coding block; for example, performing an intra-frame left and upper direction prediction based on the rightmost pixel column of a coding block adjacent to the left of the current coding block and the lowermost pixel row of a coding block adjacent to the upper of the current coding block when the rightmost pixel column of the coding block adjacent to the left of the current coding block and the lowermost pixel row of the coding block adjacent to the upper of the current coding block are both present; wherein, when one of the corresponding pixel column or pixel row is not present, the intra-frame left and upper direction prediction is performed based only on the present pixel row or pixel column; when neither the corresponding pixel column or corresponding pixel row is present, then the intra-frame left and upper prediction is not performed;

The intra-frame right and lower prediction unit 3 is used for performing an intra-frame right and lower direction prediction on the current coding block; for example, performing the intra-frame right and lower direction prediction based on the leftmost pixel column of a coding block adjacent to the right of the current coding block and the uppermost pixel row of a coding block adjacent to the lower of the current coding block when the leftmost pixel column of the coding block adjacent to the right of the current coding block and the uppermost pixel row of the coding block adjacent to the lower of the current coding block are both present; wherein, when one of the corresponding pixel column or pixel row is not present, the intra-frame right and lower direction prediction is performed based only on the present pixel row or pixel column; when neither the corresponding pixel column nor corresponding pixel row is present, then the intra-frame right and lower prediction is not performed.

The weighting unit 4, which is used for weighting the prediction result of the intra-frame left and upper direction prediction, which is output by the intra-frame left and upper prediction unit 2, and the prediction result of the intra-frame right and lower direction prediction, which is output by the intra-frame right and lower prediction unit 3.

The video coding intra-frame prediction device of the present embodiment is used to implement the corresponding video coding intra-frame prediction method in the method embodiments described above, and has the beneficial effects of the corresponding method embodiments, and will not be described again.

Figure 6:
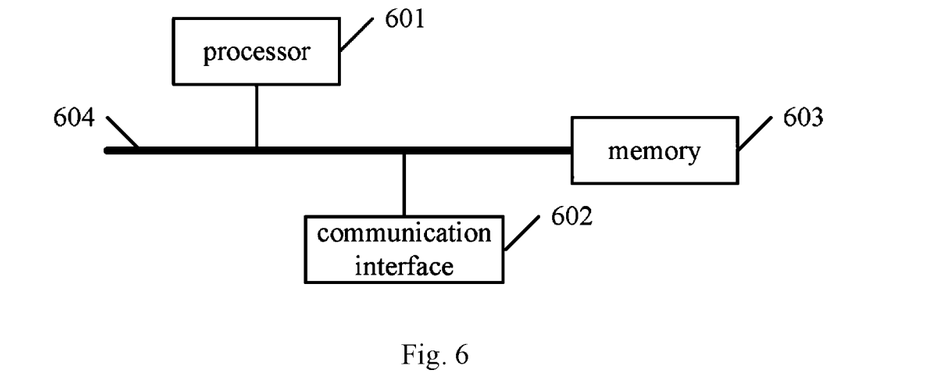
FIG. 6 is a structure block diagram of an embodiment of an electronic device in the present application.

The embodiment of the present invention also provides an electronic device, as shown in FIG. 6, which comprises a processor 601, a communication interface 602, a memory 603, and a communication bus, wherein the processor 601, the communication interface 602, and the memory 603 are communicated with each other via the communication bus 604, The memory 603 is used for storing computer program;

The processor 601 is used for implementing the following steps by executing the program stored in the memory 603:

performing a bidirectional prediction comprising an intra-frame left and upper direction prediction and an intra-frame right and lower direction prediction on a current coding block, and obtaining prediction results;

weighting the obtained prediction results.

The communication bus mentioned in the electronic device described above may be a Peripheral Component Interconnect (PCI) bus or an Extended Industry Standard Architecture (EISA) bus etc. . . . . This communication bus could be divided into address bus, data bus, control bus and so on. For ease of representation, the figure only uses one thick line to illustrate, but it does not represent that there is only one bus or one type of bus.

The communication interface is used for communication between the above-mentioned electronic device and other devices.

The memory may include a random access memory (RAM), or may include non-volatile memory (NVM), such as at least one disk memory. Optionally, the memory may also be at least one storage device which is located remote from the processor described above.

The above-mentioned processor could be an universal processor, including a Central Processing Unit (CPU), a Network Processor (NP), etc.; it could also be a Digital Signal Processing (DSP), an Application Specific Integrated Circuit (ASIC), a Field-Programmable Gate Array (FPGA) or other programmable logic devices, discrete gate or transistor logic devices, discrete hardware components.

It can be seen that in the solution provided in the present embodiment, the bidirectional prediction of the intra-frame left and upper direction prediction and the intra-frame right and lower direction prediction is performed for the current coding block and weighted thereof at the time of video coding by the electronic device. Since the distance between the current coding block and the reference prediction pixel is closer, thus the prediction correlation is high, therefore the high prediction accuracy of the current video coding block is achieved and the coding efficiency is improved.

Wherein, the above step of performing a bidirectional prediction including an intra-frame left and upper direction prediction and an intra-frame right and lower direction prediction on a current coding block could may include:

when the rightmost pixel column of a coding block adjacent to the left of the current coding block and the lowermost pixel row of a coding block adjacent to the upper of the current coding block are both present, performing the intra-frame left and upper direction prediction based on the rightmost pixel column of the coding block adjacent to the left of the current coding block and the lowermost pixel row of the coding block adjacent to the upper of the current coding block;

when one of the rightmost pixel column of a coding block adjacent to the left of the current coding block and the lowermost pixel row of a coding block adjacent to the upper of the current coding block is not present, performing the intra-frame left and upper prediction based on the present pixel row or pixel column;

when the leftmost pixel column of a coding block adjacent to the right of the current coding block and the uppermost pixel row of a coding block adjacent to the lower of the current coding block are both present, performing the intra-frame right and lower direction prediction based on the leftmost pixel column of a coding block adjacent to the right of the current coding block and the uppermost pixel row of a coding block adjacent to the lower of the current coding block;

when one of the leftmost pixel column of a coding block adjacent to the right of the current coding block and the uppermost pixel row of a coding block adjacent to the lower of the current coding block is not present, performing the intra-frame right and lower prediction based only on the present pixel row or pixel column.

Wherein, the above current coding blocks are two horizontally adjacent coding blocks, wherein the first coding block from left to right is a first coding block, and the second coding block from left to right is a second coding block;

the above step of performing bidirectional prediction of intra-frame left and upper direction prediction and intra-frame right and lower direction prediction on the current coding block could include:

for the first coding block, the intra-frame left and upper direction prediction is performed based on the lowermost pixel row of a coding block adjacent to the upper of the first coding block and the rightmost pixel column of a coding block adjacent to the left of the first coding block; and the intra-frame right and lower direction prediction is performed based on the leftmost pixel column of the second coding block;

for the second coding block, the intra-frame left and upper direction prediction is performed based on the lowermost pixel row of a coding block adjacent to the upper of the second coding block and the rightmost pixel column of the first coding block.

Wherein, the above current coding block may be four vertically and horizontally adjacent coding blocks, wherein the upper left coding block is an A coding block, the upper right coding block is a B coding block, the lower left coding block is a C coding block, and the lower right coding block is a D coding block;

the above step of performing a bidirectional prediction including an intra-frame left and upper direction prediction and an intra-frame right and lower direction prediction on a current coding block may include:

for the A coding block, the intra-frame left and upper direction prediction is performed based on the lowermost pixel row of a coding block adjacent to the upper of the A coding block and the rightmost pixel column of a coding block adjacent to the left of the A coding block; and the intra-frame right and lower direction prediction is performed based on the leftmost pixel column of the B coding block and the uppermost pixel row of the C coding block;

for the B coding block, the intra-frame left and upper direction prediction is performed based on the lowermost pixel row of a coding block adjacent to the upper of the B coding block and the rightmost pixel column of the A coding block; and the intra-frame right and lower direction prediction is performed based on the uppermost pixel row of the D coding block;

for the C coding block, the intra-frame left and upper direction prediction is performed based on the lowermost pixel row of the A coding block and the rightmost pixel column of a coding block adjacent to the left of the C coding block; and the intra-frame right and lower direction prediction is performed based on the leftmost pixel column of the D coding block;

for the D coding block, the intra-frame left and upper direction prediction is performed based on the lowermost pixel row of the B coding block and the rightmost pixel column of the C coding block.

In another embodiment provided by the present invention, it also provides a non-transitory computer readable storage medium stores instructions thereon, and when being executed on a computer, the instructions enable the computer to implement the video coding intra-frame prediction method described in any above-mentioned embodiments.

Wherein the video coding intra-frame prediction method described above may include the following steps:

performing a bidirectional prediction comprising an intra-frame left and upper direction prediction and an intra-frame right and lower direction prediction on a current coding block and obtaining prediction results; and weighting the obtained prediction results.

It can be seen that in the solution provided in the present embodiment, a bidirectional prediction including an intra-frame left and upper direction prediction and an intra-frame right and lower direction prediction is performed for the current coding block and weightings are performed during the video coding. Since the distance between the current coding block and the reference prediction pixel is closer, thus the prediction correlation is high, therefore the high prediction accuracy of the current video coding block is achieved and the coding efficiency is improved.

Wherein, the above step of performing a bidirectional prediction comprising an intra-frame left and upper direction prediction and an intra-frame right and lower direction prediction on a current coding block may comprise:

when the rightmost pixel column of a coding block adjacent to the left of the current coding block and the lowermost pixel row of a coding block adjacent to the upper of the current coding block are both present, performing the intra-frame left and upper direction prediction based on the rightmost pixel column of the coding block adjacent to the left of the current coding block and the lowermost pixel row of the coding block adjacent to the upper of the current coding block;

when one of the rightmost pixel column of a coding block adjacent to the left of the current coding block and the lowermost pixel row of a coding block adjacent to the upper of the current coding block is not present, performing the intra-frame left and upper prediction based on the present pixel row or pixel column;

when the leftmost pixel column of a coding block adjacent to the right of the current coding block and the uppermost pixel row of a coding block adjacent to the lower of the current coding block are both present, performing the intra-frame right and lower direction prediction based on the leftmost pixel column of a coding block adjacent to the right of the current coding block and the uppermost pixel row of a coding block adjacent to the lower of the current coding block;

when one of the leftmost pixel column of a coding block adjacent to the right of the current coding block and the uppermost pixel row of a coding block adjacent to the lower of the current coding block is not present, performing the intra-frame right and lower prediction based only on the present pixel row or pixel column.

Wherein, the above current coding blocks are two horizontally adjacent coding blocks, wherein the first coding block from left to right is named first coding block, the second coding block from left to right is named second coding block;

the above step of performing a bidirectional prediction including an intra-frame left and upper direction prediction and an intra-frame right and lower direction prediction on a current coding block may include:

for the first coding block, the intra-frame left and upper direction prediction is performed based on the lowermost pixel row of a coding block adjacent to the upper of the first coding block and the rightmost pixel column of a coding block adjacent to the left of the first coding block; and the intra-frame right and lower direction prediction is performed based on the leftmost pixel column of the second coding block; and for the second coding block, the intra-frame left and upper direction prediction is performed based on the lowermost pixel row of a coding block adjacent to the upper of the second coding block and the rightmost pixel column of the first coding block.

Wherein, the above current coding block may be four vertically and horizontally adjacent coding blocks, wherein the upper left coding block is an A coding block, the upper right coding block is a B coding block, the lower left coding block is a C coding block, and the lower right coding block is a D coding block;

the above step of performing a bidirectional prediction including an intra-frame left and upper direction prediction and an intra-frame right and lower direction prediction on a current coding block may include:

for the A coding block, the intra-frame left and upper direction prediction is performed based on the lowermost pixel row of a coding block adjacent to the upper of the A coding block and the rightmost pixel column of a coding block adjacent to the left of the A coding block; and the intra-frame right and lower direction prediction is performed based on the leftmost pixel column of the B coding block and the uppermost pixel row of the C coding block;

for the B coding block, the intra-frame left and upper direction prediction is performed based on the lowermost pixel row of a coding block adjacent to the upper of the B coding block and the rightmost pixel column of the A coding block; and the intra-frame right and lower direction prediction is performed based on the uppermost pixel row of the D coding block;

for the C coding block, the intra-frame left and upper direction prediction is performed based on the lowermost pixel row of the A coding block and the rightmost pixel column of a coding block adjacent to the left of the C coding block; and the intra-frame right and lower direction prediction is performed based on the leftmost pixel column of the D coding block; and for the D coding block, the intra-frame left and upper direction prediction is performed based on the lowermost pixel row of the B coding block and the rightmost pixel column of the C coding block.

In another embodiment provided by the present invention, it also provides a computer program product containing instructions that, when being executed on a computer, cause the instructions enable the computer to implement the video coding intra-frame prediction method described in any above-mentioned embodiments.

Wherein, the video coding intra-frame prediction method described above may include the following steps:

performing a bidirectional prediction comprising an intra-frame left and upper direction prediction and an intra-frame right and lower direction prediction on a current coding block and obtaining prediction results; and weighting the obtained prediction results.

It can be seen that in the solution provided in the present embodiment, a bidirectional prediction including an intra-frame left and upper direction prediction and an intra-frame right and lower direction prediction is performed for the current coding block and weightings are performed during the video coding. Since the distance between the current coding block and the reference prediction pixel is closer, thus the prediction correlation is high, therefore the high prediction accuracy of the current video coding block is achieved and the coding efficiency is improved.

Wherein, the above step of performing a bidirectional prediction comprising an intra-frame left and upper direction prediction and an intra-frame right and lower direction prediction on a current coding block may comprise:

when the rightmost pixel column of a coding block adjacent to the left of the current coding block and the lowermost pixel row of a coding block adjacent to the upper of the current coding block are both present, performing the intra-frame left and upper direction prediction based on the rightmost pixel column of the coding block adjacent to the left of the current coding block and the lowermost pixel row of the coding block adjacent to the upper of the current coding block;

when one of the rightmost pixel column of a coding block adjacent to the left of the current coding block and the lowermost pixel row of a coding block adjacent to the upper of the current coding block is not present, performing the intra-frame left and upper prediction based on the present pixel row or pixel column;

when the leftmost pixel column of a coding block adjacent to the right of the current coding block and the uppermost pixel row of a coding block adjacent to the lower of the current coding block are both present, performing the intra-frame right and lower direction prediction based on the leftmost pixel column of a coding block adjacent to the right of the current coding block and the uppermost pixel row of a coding block adjacent to the lower of the current coding block;

when one of the leftmost pixel column of a coding block adjacent to the right of the current coding block and the uppermost pixel row of a coding block adjacent to the lower of the current coding block is not present, performing the intra-frame right and lower prediction based only on the present pixel row or pixel column.

Wherein, the above current coding blocks are two horizontally adjacent coding blocks, wherein the first coding block from left to right is named first coding block, the second coding block from left to right is named second coding block;

the above step of performing a bidirectional prediction including an intra-frame left and upper direction prediction and an intra-frame right and lower direction prediction on a current coding block may include:

for the first coding block, the intra-frame left and upper direction prediction is performed based on the lowermost pixel row of a coding block adjacent to the upper of the first coding block and the rightmost pixel column of a coding block adjacent to the left of the first coding block; and the intra-frame right and lower direction prediction is performed based on the leftmost pixel column of the second coding block; and for the second coding block, the intra-frame left and upper direction prediction is performed based on the lowermost pixel row of a coding block adjacent to the upper of the second coding block and the rightmost pixel column of the first coding block.

Wherein, the above current coding block may be four vertically and horizontally adjacent coding blocks, wherein the upper left coding block is an A coding block, the upper right coding block is a B coding block, the lower left coding block is a C coding block, and the lower right coding block is a D coding block;

the above step of performing a bidirectional prediction including an intra-frame left and upper direction prediction and an intra-frame right and lower direction prediction on a current coding block may include:

for the A coding block, the intra-frame left and upper direction prediction is performed based on the lowermost pixel row of a coding block adjacent to the upper of the A coding block and the rightmost pixel column of a coding block adjacent to the left of the A coding block; and the intra-frame right and lower direction prediction is performed based on the leftmost pixel column of the B coding block and the uppermost pixel row of the C coding block;

for the B coding block, the intra-frame left and upper direction prediction is performed based on the lowermost pixel row of a coding block adjacent to the upper of the B coding block and the rightmost pixel column of the A coding block; and the intra-frame right and lower direction prediction is performed based on the uppermost pixel row of the D coding block;

for the C coding block, the intra-frame left and upper direction prediction is performed based on the lowermost pixel row of the A coding block and the rightmost pixel column of a coding block adjacent to the left of the C coding block; and the intra-frame right and lower direction prediction is performed based on the leftmost pixel column of the D coding block; and for the D coding block, the intra-frame left and upper direction prediction is performed based on the lowermost pixel row of the B coding block and the rightmost pixel column of the C coding block.

In the above embodiments, it may be implemented in whole or in part by software, hardware, firmware, or any combination thereof. When it is implemented by using the software, it may be implemented in whole or in part in the form of a computer program product. Said computer program product includes one or more computer instructions. The processes or functions described in accordance with the embodiments of the present invention are generated, in whole or in part, when the computer program instructions are loaded and executed on the computer. Said computer may be an universal computer, a dedicated computer, a computer network, or other programmable device. Said computer instructions may be stored in a non-transitory computer readable storage medium, or transmitted from one non-transitory computer readable storage medium to another non-transitory computer readable storage medium, for example, said computer instructions could be transmitted from a web site station, computer, server, or data center to another site station, computer, server or data center through wire mode (such as coaxial cable, optical fiber, digital subscriber line (DSL)) or wireless mode (such as infrared, wireless, microwave, etc.). Said non-transitory computer readable storage medium may be any available medium that the computer can access or a data storage device such as a server, a data center and so on that contains one or more available media integrations. The available medium may be magnetic medium (such as, Floppy Disk, Hard Disk, Magnetic Tape), optical medium (such as, DVD), or semiconductor medium (such as, Solid State Disk (SSD)) and so on.

The device embodiment described above is merely illustrative, wherein the units illustrated as the separating components may or may not be physically separate, and the components shown as units may or may not be physical units, that is, it could be located at one place, or distributed to multiple network units. The part or all of the modules may be selected according to the actual requirements to achieve the object of the solution of the present embodiments. The ordinary skilled in the art will understand and implement without any creative effort.

With the above description of the embodiments, it will be apparent to those skilled in the art that the various embodiments can be realized by means of software and the necessary general hardware platform, and of course be realized by hardware. Based on this understanding, the above technical solution essentially, or a part of the technical solution that contributes to the prior art, may be embodied in a form of a software product; the computer software product can be stored in a non-transitory computer readable storage medium (such as a ROM/RAM, a magnetic disk, or a compact disc, or the like) and includes a number of instructions that enable a computer device (which may be a personal computer, a server, a network device, or the like) to execute various embodiments or methods described in some sections of the embodiments.

Finally, it should be noted that: the above embodiments are merely used to illustrate the technical solutions of the present application, and are not intended to limit thereof; while the present application has been illustrated in detail with reference to the embodiments described above, those ordinary skilled in the art should understand that the technical solutions described in the embodiments described above could be modified or equivalently replaced for part of the technical features thereof, while these modifications or replacements do not depart from the spirit and the scope of the technical solutions of the various embodiments of the present application.

What is claimed is:

1. A video coding intra-frame prediction method, wherein, the method comprises:
    performing a bidirectional prediction comprising an intra-frame left and upper direction prediction and an intra-frame right and lower direction prediction on a current coding block during video coding, wherein,
    when performing video coding on two horizontally adjacent coding blocks simultaneously, wherein the first one coding block from left to right in the two coding blocks is a first coding block, and the second one coding block from left to right in the two coding blocks is a second coding block,
    performing the intra-frame left and upper direction prediction on the first coding block based on the lowermost pixel row of a coding block adjacent to the upper of the first coding block and the rightmost pixel column of a coding block adjacent to the left of the first coding block, performing the intra-frame right and lower direction prediction based on the leftmost pixel column of the second coding block, and weighting the intra-frame left and upper direction prediction and the right and lower direction prediction; and
    performing the intra-frame left and upper direction prediction on the second coding block based on the lowermost pixel row of a coding block adjacent to the upper of the second coding block and the rightmost pixel column of the first coding block, and not performing the intra-frame right and lower prediction.

2. The method according to claim 1, wherein, the bidirectional prediction further comprises:
    performing the intra-frame left and upper direction prediction and the intra-frame right and lower direction prediction on the current coding block and performing weighting during video coding.

3. The method according to claim 1, wherein,
    the intra-frame left and upper direction prediction on the current coding block is performed based on a rightmost pixel column of a coding block adjacent to the left of the current coding block and a lowermost pixel row of a coding block adjacent to the upper of the current coding block; wherein, when one of the corresponding pixel column or pixel row is not present, the intra-frame left and upper prediction is performed based only on the present pixel row or pixel column;
    the intra-frame right and lower direction prediction on the current coding block is performed based on a leftmost pixel column of a coding block adjacent to the right of the current coding block and a uppermost pixel row of a coding block adjacent to the lower of the current coding block; wherein, when one of the corresponding pixel column or pixel row is not present, the intra-frame right and lower prediction is performed based only on the present pixel row or pixel column; and
    weighting a prediction in which both of the intra-frame left and upper direction prediction and the intra-frame right and lower direction prediction are performed.

4. The method according to claim 3, wherein,
    when simultaneously performing video coding on four coding blocks that are adjacent vertically and horizontally, wherein a coding block at upper left of the four coding blocks is an A coding block, a coding block at upper right of the four coding blocks is a B coding block, a coding block at lower left of the four coding blocks is a C coding block, and a coding block at lower right of the four coding blocks is a D coding block,
    performing the intra-frame left and upper direction prediction on the A coding block based on the lowermost pixel row of a coding block adjacent to the upper of the A coding block and the rightmost pixel column of a coding block adjacent to the left of the A coding block, performing the intra-frame right and lower direction prediction on the A coding block based on the leftmost pixel column of the B coding block and the uppermost pixel row of the C coding block, and weighting the intra-frame left and upper direction prediction and the right and lower direction prediction;
    performing the intra-frame left and upper direction prediction on the B coding block based on the lowermost pixel row of a coding block adjacent to the upper of the B coding block and the rightmost pixel column of the A coding block, performing the intra-frame right and lower direction prediction on the B coding block based on the uppermost pixel row of the D coding block, and weighting the intra-frame left and upper direction prediction and the right and lower direction prediction;
    performing the intra-frame left and upper direction prediction on the C coding block based on the lowermost pixel row of the A coding block and the rightmost pixel column of a coding block adjacent to the left of the C coding block, and performing the intra-frame right and lower direction prediction on the C coding block based on the leftmost pixel column of the D coding block, and weighting the intra-frame left and upper direction prediction and the right and lower direction prediction; and
    performing the intra-frame left and upper direction prediction on the D coding block based on the lowermost pixel row of the B coding block and the rightmost pixel column of the C coding block, and not performing the intra-frame right and lower prediction.

5. An electronic device, wherein, the electronic device comprises: at least one processor, a communication interface, a memory, and a communication bus, wherein the at least one processor, the communication interface, and the memory are communicated with each other via the communication bus;
    the memory is used for storing computer programs; and
    the at least one processor is used for implementing the method according to claim 1 by executing the program stored on the memory.

6. A non-transitory computer readable storage medium, wherein, the computer readable storage medium stores instructions thereon, and when being executed on a computer, the instructions enable the computer to implement the method according to claim 1.

7. A video coding intra-frame prediction device, wherein, the device comprises:
- an intra-frame left and upper prediction unit used for performing an intra-frame left and upper direction prediction on a current coding block; and
- an intra-frame right and lower prediction unit used for performing an intra-frame right and lower direction prediction on the current coding block, wherein, when performing video coding on two horizontally adjacent coding blocks simultaneously, wherein the first one coding block from left to right in the two coding blocks is a first coding block, and the second one coding block from left to right in the two coding blocks is a second coding block, performing the intra-frame left and upper direction prediction on the first coding block based on the lowermost pixel row of a coding block adjacent to the upper of the first coding block and the rightmost pixel column of a coding block adjacent to the left of the first coding block, performing the intra-frame right and lower direction prediction based on the leftmost pixel column of the second coding block, and weighting the intra-frame left and upper direction prediction and the right and lower direction prediction; and performing the intra-frame left and upper direction prediction on the second coding block based on the lowermost pixel row of a coding block adjacent to the upper of the second coding block and the rightmost pixel column of the first coding block, and not performing the intra-frame right and lower prediction.

8. The device according to claim 7, wherein, further comprises:
- a weighting unit used for weighting the intra-frame left and upper direction prediction and the intra-frame right and lower direction prediction on the current coding block.

9. The device according to claim 7, wherein,
the intra-frame left and upper prediction unit is further used for performing the intra-frame left and upper direction prediction based on a rightmost pixel column of a coding block adjacent to the left of the current coding block and a lowermost pixel row of a coding block adjacent to the upper of the current coding block; wherein, when one of the corresponding pixel column or pixel row is not present, the intra-frame left and upper prediction is performed based only on the present pixel row or pixel column; and the intra-frame right and lower prediction unit is further used for performing the intra-frame right and lower direction prediction based on a leftmost pixel column of a coding block adjacent to the right of the current coding block and a uppermost pixel row of a coding block adjacent to the lower of the current coding block; wherein, when one of the corresponding pixel column or pixel row is not present, the intra-frame right and lower prediction is performed based only on the present pixel row or pixel column.

10. The device according to claim 8, wherein,
the intra-frame left and upper prediction unit is further used for performing the intra-frame left and upper direction prediction based on a rightmost pixel column of a coding block adjacent to the left of the current coding block and a lowermost pixel row of a coding block adjacent to the upper of the current coding block; wherein, when one of the corresponding pixel column or pixel row is not present, the intra-frame left and upper prediction is performed based only on the present pixel row or pixel column; and the intra-frame right and lower prediction unit is further used for performing the intra-frame right and lower direction prediction based on a leftmost pixel column of a coding block adjacent to the right of the current coding block and a uppermost pixel row of a coding block adjacent to the lower of the current coding block; wherein, when one of the corresponding pixel column or pixel row is not present, the intra-frame right and lower prediction is performed based only on the present pixel row or pixel column.

* * * * *